United States Patent Office 3,729,475
Patented Apr. 24, 1973

3,729,475
PHENYL ALKYL AMINE DERIVATIVES
William Robert Nigel Williamson, Farnham, Terence Alan Hicks, Farnborough, and Elaine Hilda Day, Bristol, England, assignors to Lilly Industries Limited, London, England
No Drawing. Continuation-in-part of application Ser. No. 866,026, Oct. 13, 1969. This application Mar. 17, 1971, Ser. No. 125,421
Int. Cl. C07d 29/30
U.S. Cl. 260—293.73    2 Claims

ABSTRACT OF THE DISCLOSURE

Phenyl alkyl amine derivatives in which the phenyl ring is substituted by a heterocyclic amino group. The compounds possess central nervous system activity and a powerful anti-inflammatory action.

CROSS-REFERENCE TO RELATED APPLICATIONS

This application is a continuation-in-part of our copending application Ser. No. 866,026, filed the Oct. 13, 1969.

The present invention provides novel phenyl alkyl amine derivatives of the formula:

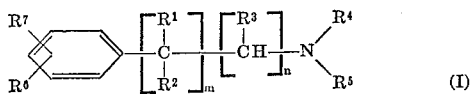

and pharmaceutically acceptable acid addition salts thereof, wherein $R^1$ and $R^2$ are independently hydrogen or $C_{1-4}$ alkyl; $n$ is an integer from 1 to 4; $m$ is zero or 1; $R^3$ is hydrogen or in no more than one instance where it occurs is $C_{1-4}$ alkyl; $R^4$ is hydrogen or $C_{1-4}$ alkyl and $R^5$ is hydrogen, $C_{1-4}$ alkyl, acetyl, hydroxyacetyl, trihaloacetyl, benzoyl, or

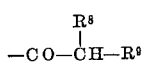

(where $R^8$ is hydrogen or methyl and $R^9$ is 4-piperidinophenyl or 3-chloro-4-piperidinophenyl), or $R^4$ and $R^5$ together with the adjacent nitrogen represent the group $R^6$; $R^6$ is pyrrolidino, piperidino, homopiperidino, piperazino, 4-methylpiperazino or morpholino; and $R^7$ is hydrogen, halogen, methyl, methoxy, trifluoromethyl, nitro, amino, methylamino, dimethylamino, or the group —$NHCOR^1$ where $R^1$ is as defined above.

Preferred compounds falling within the scope of compounds defined in Formula I above are those having one or more of the following characteristics:

(a) $R^1$ is hydrogen, methy or ethyl and $m$ is 1;
(b) $R^2$ is hydrogen, methyl or ethyl and $m$ is 1;
(c) $R^3$ is hydrogen or methyl, $n$ is 0 or 1, and $m$ is 1;
(d) the group

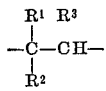

has a total of from 2 to 6 carbon atoms;
(e) $R^4$ is hydrogen or methyl;
(f) $R^5$ is hydrogen, methyl, acetyl, trichloroacetyl, trifluoroacetyl or

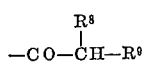

(where $R^8$ and $R^9$ are as defined above);
(g) $R^4$ and $R^5$ together with the adjacent nitrogen represent pyrrolidino, piperidino or homopiperidino;
(h) $R^6$ is in the para or meta positions of the phenyl ring;
(i) $R^7$ is ortho to the group $R^6$;
(j) $R^7$ is hydrogen, halogen, methyl, nitro or amino;
(k) $R^6$ is pyrrolidino, piperidino or homopiperidino.

The most preferred group of compounds of the present invention have the structure:

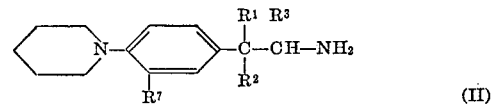

and acid addition salts thereof, wherein $R^1$, $R^2$ and $R^3$ are independently hydrogen or methyl, and $R^7$ is hydrogen, chloro, bromo or methyl.

The present invention also provides a process for preparing the compounds of Formula I characterised in that a process known to be useful in the synthesis of N-phenyl heterocyclic amines or phenyl alkyl amines is used. Such known methods are well documented in the scientific literature and are well known to chemists skilled in the art who may readily adapt the known processes to prepare the compounds of this invention. Thus, for example, the known process for preparing an N-phenyl piperidine comprising condensing a halo- or amino-benzene with piperidine or with a 1,5-dihalopentane respectively may be adapted to produce a process for preparing the compounds of this invention comprising reacting a halo- or aminophenyl alkyl amine of the formula:

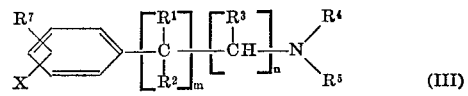

wherein $R^1$ to $R^5$, $R^7$, $m$ and $n$ are as defined above and X is halo or amino (provided $R^7$ and X are not both halo or amino), with—when X is halo—an amine of the formula $R^6$-H where $R^6$ is as defined above, and—when X is amino—with a compound of the formula:

where Y is halo and Z is —$(CH_2)_a$— where $a$ is 2, 3 or 4, or —$CH_2$—$R^{10}$—$CH_2$— where $R^{10}$ is —NH—, —$NCH_3$— or —O—.

This reaction of a compound of Formula III with the amine $R^6$—H or a compound of Formula IV may be carried out in a known manner, the reactants being reacted at or below room temperature or at elevated temperatures—depending on the nature of the particular reactants—in a suitable solvent such as alcohol, benzene, toluene, dimethylsulphoxide, chloroform, tetrahydrofuran or dimethylformamide. If a compound in which $R^4$ and $R^5$ are both hydrogen is to be prepared by this method, then the $NR^4R^5$ group may be protected, for example by acylation, during the condensation and thereafter the protecting group removed, for example, by hydrolysis in the case of an acyl protecting group.

Similarly known methods for the preparation of phenyl alkyl amines may be adapted in conventional manner to prepare the compounds of this invention. Such known methods generally involve the conversion of a benzene derivative having a substituent which is convertible by reduction, hydrolysis or the like to the required aminoalkyl substituent. Accordingly these known processes may be modified to provide a process for preparing the compounds of Formula I characterised in that a compound of the formula:

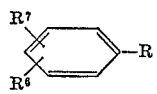

where $R^6$ and $R^7$ are as hereinbefore defined and R is a group capable of being converted to the desired

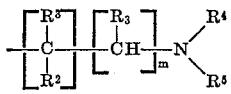

substituent, is treated in such a manner as to produce the desired conversion.

Most commonly group R is a substituent capable of being reduced to the desired substituent. Exemplary of reducible substituents and the end-products of the reduction are:

(i)

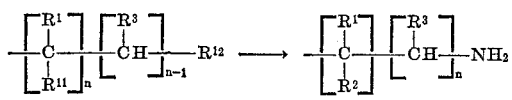

where $m$, $n$, $R^1$, $R^2$ and $R^3$ are as defined above, $R^{11}$ represents $R^2$ or hydroxyl, halogen, acetoxy, acetylthio, benzoyloxy or another group replaceable by hydrogen under the reduction conditions employed, and $R^{12}$ represents —CN or the group

(ii)

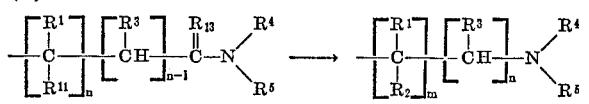

wherein $R^1$, $R^2$, $R^3$, $R^4$, $R^5$, $R^{11}$, $m$ and $n$ are as defined above and $R^{13}$ is oxygen or sulphur, provided that $R^5$ may additionally be hydroxyl or benzoyloxy when $R^4$ is hydrogen;

(iii)

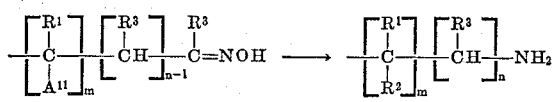

where $R^1$, $R^2$, $R^3$, $R^{11}$, $m$ and $n$ are defined above, provided that at least one of the $R^3$ groups in the oxime starting material is hydrogen and provided that, in addition to the definition given above, the other $R^3$ group may represent phenoxyalkyl, the phenoxy moiety of which is removed under the reaction conditions employed. The phenylsulphonyl or toluenesulphonyl derivatives of the oxime may also be used, the corresponding acid addition salt of the amine being obtained;

(It should be noted that, in reactions (i) to (iii) above, the group

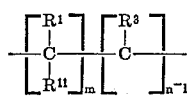

has been shown as a fully saturated group but it may, as well known in the art, contain at least one double bond which becomes saturated during the reduction.)

(iv)

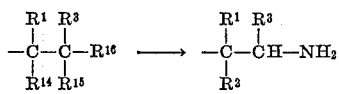

where $R^{16}$ is —NO, or —NO$_2$; when $R^{16}$ is —NO, $R^{14}$ is chloro or bromo and $R^{15}$ is hydrogen; and when $R^{16}$ is —NO$_2$, $R^{14}$ represents $R^2$ and $R^{15}$ is hydrogen, or $R^{14}$ together with $R^{15}$ represents a valency bond;

(v)

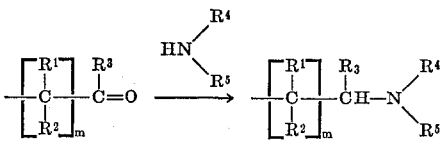

where $R^1$, $R^2$, $R^3$ and $m$ are as defined above, and $R^4$ and $R^5$ are independently hydrogen or alkyl.

All of the foregoing reductions (i) to (v) are well documented in the literature and may be carried out under a variety of conditions, for example electrolytically, using hydrogen in the presence of a suitable catalyst such as Raney nickel, platinum oxide, palladium on charcoal or palladium on barium sulphate, or using a chemical reducing agent such as sodium or aluminum amalgam in ethanol, zinc and hydrochloric acid, sodium in ethanol, diborane, diethylsilane and boron trichloride, hydrazine hydrate in the presence of Raney nickel, Raney nickel in aqueous alkali, lithium aluminium hydride either alone or together with aluminium chloride, or sodium borohydride optionally in the presence of palladium, copper, platinum or nickel salts or together with cobaltous chloride.

In addition to group R in Formula V which may be reduced as above to produce the desired compounds of Formula I, other R groups may be converted by various other methods to yield the desired compounds. Exemplary of such other reactions are:

(vi)

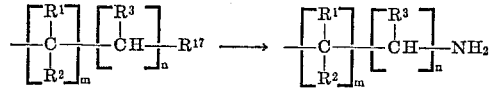

where $R^1$, $R^2$, $R^3$, $m$ and $n$ are as defined above and $R^{17}$ is —NCO, —NHCO$_2$R$^{18}$ (where $R^{18}$ is alkyl), —CON$_3$ or

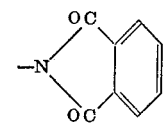

The desired conversion of the isocyanate or urethan intermediate may be carried out by hydrolysis under alkaline conditions, for example using potassium or sodium hydroxide, or under acid conditions, for example using concentrated hydrochloric acid. The isocyanate may be obtained by a number of methods including the Lossen reaction (treatment of the corresponding hydroxamic acid-$R^{17}$ represents —CO.NHOH— with a strong inorganic acid), the Hofmann degradation reaction (treatment of the corresponding amide-$R^{17}$ represents —CO.NH$_2$— with bromine, chlorine, or an alkali metal hypobromite or hypochlorite, and an alkali such as potassium hydroxide) and the Curtius reaction (treatment of the corresponding acid azide-$R^{17}$ represents —CON$_3$— with benzene or chloroform at elevated temperatures). The urethan intermediate may be obtained from the isocyanate by warming with an alcohol $R^{18}$—OH, or by a modification of the Hofmann reaction using bromine and an alkali metal alkoxide, or by a modification of the Curtius reaction involving boiling the acid azide in the alcohol $R^{18}$—OH. When $R^{17}$ is —CON$_3$, a further modification of the Curtius reaction involving heating the acid azide with bromine in carbon tetrachloride produces the desired amine directly. The phthalimido intermediate may be converted to the desired amine by hydrolysis under the conditions given above or by treatment with hydrazine. The phthalimido intermediate is obtained by using Gabriel's reaction involving reacting the corresponding compound where $R^{17}$ is halogen with potassiophthalimide. It will of course be appreciated that the intermediate shown in the above reaction sequence (vi) need not be isolated prior to conversion to the amine and that the final reaction step may readily, and will commonly, be carried out in the reaction medium in which the intermediate was formed;

(vii) 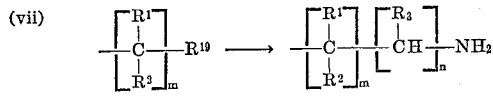

where $R^1$, $R^2$, $R^3$, $m$ and $n$ are as defined above and $R^{19}$ is

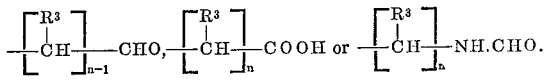

When the aldehyde or acid intermediate is used, the conversion may be accomplished using the Schmidt reaction, i.e. by treatment with hydrazoic acid or its sodium or potassium salts in the presence of concentrated sulphuric acid. In the case of the aldheyde intermediate, a mixture of the corresponding nitrile and formamide is obtained. The mixture may be reduced, for example using hydrogen over Raney nickel, to produce the desired amine. The formamide may also be converted to the amine by hydrolysis using for example sodium hydroxide or sulphuric acid. The formamide may be prepared from the aldehyde or a ketone in which $R^{19}$ is

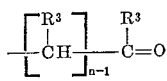

using the Leuckart reaction involving treatment of the aldehyde or ketone with excess ammonium formate or formamide itself. As with reaction (vi) above, the intermediates need not be isolated from the medium in which they are prepared prior to their conversion to the amine.

(viii) 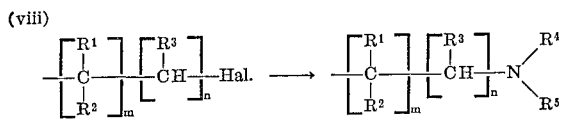

wherein $R^1$, $R^2$, $R^3$, $m$ and $n$ are as defined above and Hal. is a halogen atom, the conversion being achieved either by reaction with hexamethylenetetramine in hot ethanol and in the presence of sodium iodide, or by formation of a Grignard reagent followed by reaction with chloramine or, when Hal. is chloro or bromo, with O-methylhydroxylamine. The halogeno intermediate may also be reacted with the amine $HNR^4R^5$, at least one of $R^4$ and $R^5$ being other than hydrogen, and, if desired, a resultant amide ($R^5$ is an acyl group) may be hydrolysed with for example concentrated hydrochloric acid to yield the amine.

(ix) 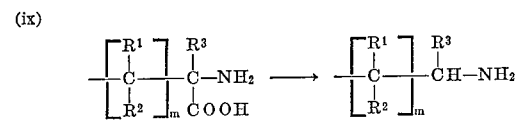

where $R^1$, $R^2$, $R^3$ and $m$ are as defined above, the decarboxylation being accomplished by heating, optionally in the presence of barium hydroxide. If desired, the amino group may be protected during the reaction, for example by prior reaction with acetophenone or benzophenone, and the free amine liberated, after decarboxylation, by acid hydrolysis.

(x) 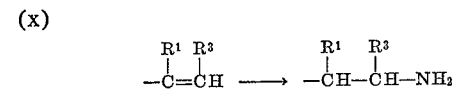

where $R^1$ and $R^3$ are as defined above, the conversion being carried out by hydroboration of the styrene intermediate using diborane, followed by treatment with chloramine or hydroxylamine-O-sulphonic acid.

(xi) when R in Formula V is hydrogen, by reaction with a cyclic imine of formula:

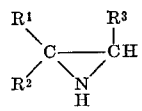

in the presence of a Friedel-Crafts catalyst such as aluminium chloride, to produce the desired compound of Formula I in which $m$ and $n$ are both 1.

It will be appreciated that the substituents $R^4$, $R^5$ and $R^7$ in the desired compound of Formula I may be converted to another substituent falling within the definition of these groups in Formula I. Such a conversion may be carried out at an intermediate stage of the above reaction sequences or as the ultimate step. Thus a nitro group $R^7$ may be reduced to an amino group, for example catalytically using platinum or palladium or using nascent hydrogen, for example zinc or tin and hydrochloric or acetic acid. An amino group $R^7$ may be replaced by halogen using the well known Sandmeyer or Gattermann reactions. An amino group $R^7$ or $NR^4R^5$ (at least one of $R^4$ or $R^5$ being hydrogen) may readily be alkylated or acylated by conventional procedures to produce the corresponding alkylamino or acylamino compounds. Where $NR^4R^5$ represents a heterocyclic ring, it can readily be prepared by condensing the primary amine with a compound of Formula IV.

The novel compounds of Formula I may be isolated from the process of the present invention either as the free base or in acid addition salt form. The latter is, for most purposes of the present invention, the preferred form and includes particularly the pharmaceutically acceptable non-toxic addition salts with suitable acids, such as those with inorganic acids or acid salts such as sodium hydrogen carbonate, hydrochloric acid, hydrobromic acid, nitric acid, sulphuric acid or phosphoric acid, or with organic acids, such as organic carboxylic acids, for example succinic, glycollic, maleic, hydroxymaleic, malic, tartaric, citric, salicylic, o-acetyloxybenzoic, nicotinic or isonicotinic acid, or organic sulphonic acids, for example methane sulphonic, ethane sulphonic, 2-hydroxyethane sulphonic, toluene-p-sulphonic or naphthalene-2-sulphonic acid.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example sodium, potassium or calcium carbonate or hydrogen carbonate; with ammonia; or with a hydroxyl ion-exchange preparation, or with any other suitable reagent.

A resulting acid solution salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

If the compounds of Formula I contain an asymmetry centre, they are usually obtained in racemic form. If they have two or more asymmetry centres, then these compounds are generally obtained in the form of mixtures of racemates; the individual racemates can be isolated and obtained in pure form from these mixtures in known manner, for example by repeated recrystallization from suitable solvents. These racemates can be separated into their optical antipodes by a number of known methods as indicated in the literature.

Thus, some racemic mixtures can be precipitated in the form of eutectics instead of in the form of mixed crystals and can be separated quickly in this way; in these cases, selective precipitation may also be possible. The method of chemical separation is, however, generally preferable. For this purpose, diastereomers are formed from the racemic mixture by reaction with an optically active separating agent. Thus the compounds of Formula I may be converted to salts by reaction with optically active acids, such as D- and L-tartaric acid, dibenzoyl D- and L-tartaric acid, diacetyl D- and L-tartaric acid, β-camphorsulphonic acid, D- and L-mandelic acid, D- and L-malic acid or D- and L-lactic acid. The difference in the solubility of the diastereomers obtained permits selective crystallisation of one form and regeneration of the optically active amine of Formula I from the mixture. In addition, optically active compounds can, of course, be obtained by the above mentioned processes by using starting materials which are already optically active.

As stated above, the compounds of Formula I have been found to possess valuable pharmacological properties in that they have been found to affect the central nervous system of animals when administered at doses of from 20 to 250 mg./kg. In particular, their C.N.S. action is such as to render the compounds useful as anorexic, anti-hallucinogenic and anti-Parkinson agents. In addition, the compounds possess a powerful anti-inflammatory action at the above mentioned doses without detectable incidence of gastric irritation which is a common defect of most known acidic anti-inflammatory agents. In humans, doses of from about 1 to 25 mg./kg. will normally produce the required pharmacological effect although it will be appreciated that the human dosage regime will be determined by a physician in the light of all the relevant circumstances including the condition to be treated, the physical condition of the patient, the choice of compound to be administered and the route of administration and therefore the above dosage range is not intended to limit the scope of the invention in any way.

The compounds of Formula I will normally be administered in composition form and accordingly the present invention also provides pharmaceutical compositions comprising at least one compound of Formula I in association with a pharmaceutically acceptable carrier therefor.

The compositions of the present invention may be administered orally, parenterally or rectally in the form of, for example, tablets, capsules, suppositories or suspensions. Advantageously for this purpose, compositions may be provided in dosage unit form, preferably each dosage unit containing from 5 to 1000 mg., more advantageously 60 to 750 mg., of a compound of Formula I.

In this specification the expression "dosage unit form" is used as meaning a physically discrete unit containing an individual quantity of the active ingredient, generally in admixture with a pharmaceutical diluent therefor or otherwise in association with a pharmaceutical carrier, the quantity of the active ingredient being such that one or more units are normally required for a single therapeutic administration or that, in the case of severable units such as scored tablets, at least one fraction such as a half or quarter of a severable unit is required for a single therapeutic administration.

The formulations of the present invention normally will consist of at least one compound of Formula I mixed with a carrier, or diluted by a carrier, or enclosed or encapsulated by a carrier in the form of a capsule, sachet, cachet, paper or other container. A carrier or diluent may be a solid, semi-solid or liquid material which serves as a vehicle, excipient or medium for the active therapeutic substance. Some examples of the diluents or carriers which may be employed in the pharmaceutical formulations of the present invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, polyoxyethylene sorbitan monolaurate, and methyl- and propyl-hydroxybenzoate. In the case of tablets, a lubricant may be incorporated to prevent sticking and binding of the powdered ingredients in the dies and on the punch of the tabletting machine. For such purpose, there may be employed for instance talc, aluminium, magnesium or calcium stearate or mineral oil.

The following examples will further illustrate the preparation of the novel compounds of this invention:

EXAMPLE 1

4 - piperidinophenylacetonitrile (5 g., 0.025 mole) in 12% ammonia in ethanol (50 ml.) was hydrogenated over Raney nickel catalyst (2.5 g.) at 60 p.s.i. to give 4-piperidinophenylethylamine, B.P. 117–120° C./0.15 mm. Hg which was converted to its dihydrochloride by treatment with hydrogen chloride in ether, M.P. 233–235° C. after recrystallisation from ethanol. To the dihydrochloride in water was added sodium hydrogen carbonate. After standing for 1½ hours, filtering, washing and drying, the carbonate was obtained, M.P. 91–95° C. The ethylamine was also obtained by reduction of the nitrile using lithium aluminum hydride.

Similarly 3-piperidinophenylethylamine, B.P. 110–112° C./0.15 mm. Hg and its dihydrochloride, M.P. 218–220° C., were prepared from 3-piperidinophenylacetonitrile; 2-(4-piperidinophenyl) propylamine, B.P. 112–114°C./0.25 mm. Hg, its dihydrochloride, M.P. 226–229° C., and its hemi-carbonate, hemi-hydrate, M.P. 79–82° C. (dec.), were prepared from 2-(4-piperidinophenyl)propionitrile; 2-(4-pyrrolidinophenyl)butylamine was prepared from 2-(4-pyrrolidinophenyl)butyronitrile; 2-(3-bromo-4-morpholinophenyl) propylamine was prepared from 2-(3-bromo-4-morpholinophenyl)propionitrile; 2-(3-piperidinophenyl)propylamine, B.P. 122–124° C./0.3 mm. Hg and its succinic acid salt, M.P. 141–142° C. were prepared from 2-(3-piperidinophenyl)propionitrile; 2-(3-chloro-4-piperidinophenyl)propylamine dihydrochloride was prepared from 2-(3-chloro-4-piperidinophenyl)propionitrile; 3-chloro-4-piperidinophenylethylamine, B.P. 163–164° C./3 mm. Hg and its dihydrochloride, M.P. 198–200° C. were prepared from 3-chloro-4-piperidinophenylacetonitrile; 2-piperidinophenylethylamine, B.P. 90–110° C./0.7 mm. Hg and its succinic acid salt, M.P. 168–169° C. were prepared from 2-piperidinophenylacetonitrile; 2-[4-(4-methyl - 1 - piperazinyl)phenyl]propylamine was prepared from 2-[4-(4-methyl-1-piperazinyl)phenyl]propionitrile; 2-(3-methoxy - 4 - homopiperidinophenyl)propylamine was prepared from 2-(3-methoxy-4-homopiperidinophenyl)propionitrile; 3-(3-trifluoromethyl-4-piperidinophenyl)butylamine was prepared from 3-(3-trifluoromethyl-4-piperidinophenyl)butyronitrile; 3-(4-piperidinophenyl)propylamine dihydrochloride, M.P. 180° C. (dec.) was prepared from 3-(4-piperidinophenyl)propionitrile; 3-dimethylamino - 4 - piperidinophenylethylamine was prepared from 3-dimethylamino - 4 - piperidinophenylacetonitrile; 3-methyl-4-homopiperidinophenylethylamine was prepared from 3-methyl-4 - homopiperidinophenylacetonitrile; and 2,2-dimethyl-2 - (4 - piperidinophenyl)ethyl amine and its succinic acid salt, M.P. 155–161° C., were prepared from 2,2-dimethyl-2-(4-piperidinophenyl)acetonitrile.

EXAMPLE 2

(a) 4-piperidinophenylethylamine (9.5 g., 0.0465 mole) was refluxed for 8 hours with 90% formic acid (11.9 g., 0.23 mole) and 40% (w./v.) formaldehyde solution (7.7 ml., 0.1 mole). Concentrated hydrochloric acid (4.2 ml., 0.05 mole) was added and the mixture evaporated to dryness at 50° C. in vacuo. The residue was dissolved in water, made basic with 25% sodium hydroxide and extracted with ether. The ethereal extract was washed with saturated sodium chloride solution, dried (K₂CO₃) and filtered. The ether was evaporated to give N,N-dimethyl-4-piperidinophenylethylamine, B.P. 121–123° C./0.02 mm. Hg, which, on treatment with ethereal hydrogen chloride, yielded N,N-dimethyl-4-piperidinophenylethylamine dihydrochloride, M.P. 250–253° C. from absolute ethanol. Similarly, N,N-dimethyl-2-(4 - piperidinophenyl)propylamine dihydrochloride, M.P. 240–243° C., was obtained.

(b) 4 - piperidinophenylethylamine dihydrochloride (27.7 g.) was stirred at room temperature for 20 hours in trifluoroacetic anhydride (50 ml.). The solution was poured into saturated sodium hydrogen carbonate solution (750 ml.), the precipitated solid filtered off, washed with water and dried at room temperature, under vacuum, to give N-trifluoroacetyl-4-piperidinophenylethylamine, M.P. 110–112° C. Similarly using 2-(4-piperidinophenyl)propylamine dihydrochloride and acetic anhydride or trifluoroacetic anhydride, there was obtained N-acetyl-2-(4-piperidinophenyl)propylamine, M.P. 70–73° C. and N-trifluoroacetyl-2-(4-piperidinophenyl)propylamine, M.P. 84–87° C., respectively.

(c) 4-piperidinophenethylamine dihydrochloride (10 g.) was treated with trichloroacetic anhydride (66.8 g.) and stirred at room temperature for 20 hours. The solution was processed as in Example (b) above to give N-trichloroacetyl-4-piperidinophenylethylamine, M.P. 110° C. after recrystallisation from isopropanol.

(d) N-trifluoroacetyl-4-piperidinophenylethylamine (3 g.) in dry acetone (50 ml.) with methyl iodide (5.7 g.) has warmed nearly to reflux and powdered potassium hydroxide (2.24 g.) was added. The mixture was heated under reflux for 5 minutes, excesss methyl iodide and acetone were removed on a rotary evaporator and water (50 ml.) was added and the mixture extracted with ether. The combined ethereal extracts were divided into 2 portions.

One portion was dried over sodium sulphate and, after removal of the sodium sulphate, saturated ethereal hydrogen chloride (20 ml.) was added to give N-methyl-N-trifluoroacetyl-4-piperidinophenylethylamine hydrochloride, M.P. 178–180° C. Similarly N-methyl-N-trifluoroacetyl-2-(4-piperidinophenyl)propylamine hydrochloride, M.P. 240–243° C.—softening at about 183° C.—was obtained.

The other portion of the ethereal extract was evaporated and the residue refluxed for 3.5 hours in 90% ethanol containing potassium hydroxide (8.74 g.). The solution was diluted with water, extracted with ether, the ether extracts washed with saturated sodium chloride solution, dried (Na₂SO₄) and filtered and evaporated to give an oil. This was dissolved in boiling ethanol and added to a solution of succinic acid in ethanol to give the succinic acid salt of N-methyl-4-piperidinophenylethylamine, M.P. 132–133° C. Similarly N-methyl-2 - (4 - piperidinophenyl)propylamine dihydrochloride, M.P. 240–245° C., was obtained.

(e) 4-piperidinophenylethylamine dihydrochloride was reacted with 4-piperidinophenylacetic anhydride under the conditions described in Example (b) above, to yield N-(4-piperidinophenylacetyl) - 4 - piperidinophenylethylamine, M.P. 156–158° C.

(f) 4-piperidinophenylethylamine (11.69 g., 0.573 mole) was heated with dimethylformamide (85 ml.), potassium carbonate (8.81 g.), cuprous iodide (0.17 g.), potassium iodide (0.15 g.), and 1,5-dibromopentane (19.77 g., 0.086 mole) in an oil bath at 140° C. with stirring for 5½ hours. The reaction mixture was allowed to cool and stand overnight at room temperature. The liquor was decanted off and evaporated, and both residues were then extracted with ethyl acetate/water. The aqueous layer was separated and extracted with ethyl acetate. The combined ethyl acetate extracts were extracted with 2 N hydrochloric acid and the acid solution basified with sodium carbonate. The aqueous solution was extracted with ethyl acetate and the extracts filtered and distilled to give N-(4-piperidinophenylethyl)piperidine, B.P. 163–166° C./0.6 mm. Hg.

On standing, the latter solidified and the solid, after grinding, had M.P. 42–44° C. Similarly N-[2-(4-piperidinophenyl)propyl]piperidine dihydrochloride, M.P. 265° C. (dec.), was obtained.

Using similar procedures to those described in Examples (a) to (f) above, the following derivatives of the primary amines prepared in Example 1 can be obtained.

N,N-dimethyl-3-piperidinophenylethylamine dihydrochloride
N-methyl-N-ethyl-2-(4-piperidinophenyl)propylamine dihydrochloride
N,N-diethyl-2-(4-piperidinophenyl)propylamine
N-trifluoroacetyl-3-(4-piperidinophenyl)propylamine
N-trichloroacetyl-2-(4-piperidinophenyl)propylamine
N-methyl-N-trifluoroacetyl-3-(4-piperidinophenyl)propylamine
N-methyl-2-(4-piperidinophenyl)propylamine, succinic acid salt
N-benzoyl-2-(4-piperidinophenyl)propylamine
N-[2-(4-piperidinophenyl(propionyl]-2-(4-piperidinophenyl)propylamine
N,N-dimethyl-2-(4-pyrrolidinophenyl)butylamine dihydrochloride
N-acetyl-2-(3-bromo-4-morpholinophenyl)propylamine
N-trifluoroacetyl-2-(3-piperidinophenyl)propylamine
N-trichloroacetyl-3-chloro-4-piperidinophenylethylamine
N-ethyl-2-[4-(4-methyl-1-piperazinyl)phenyl]propylamine, succinic acid salt
N,N-dimethy-2-(3-methoxy-4-homopiperidinophenyl)propylamine dihydrochloride
N-trifluoroacetyl-3-(3-trifluoromethyl-4-piperidinophenyl)butylamine
N-trifluoroacetyl-3-(4-piperidinophenyl)propylamine
N,2,2-trimethyl-2-(4-piperidinophenyl)ethylamine dihydrochloride
N-(4-piperidinophenylethyl)morpholine

EXAMPLE 3

A solution of 2-(4-piperidinophenyl)propionamide (3.65 g., 0.016 mole) in boiling dry benzene (60 ml.) was added during 5 minutes to a stirred suspension of lithium aluminum hydride (1.8 g., 0.048 mole) in dry ether (35 ml.), refluxed for 1 hour and then stirred at room temperature for 1 hour. The mixture was cooled and cautiously decomposed by dropwise addition of water (1.8 ml.), followed by 15% sodium hydroxide solution (1.8 ml.) and finally water (5.4 ml.). The mixture was stirred for ½ hour, filtered and the residue washed with ether. The ethereal filtrate and washings were combined, and dried over magnesium sulphate. The ether was concentrated and the residue distilled to give 2-(4-piperidinophenyl)-propylamine, B.P. 112–114° C./0.25 mm. Hg, which was then converted to its dihydrochloride, M.P. 226–229° C.

Using a similar reduction procedure, the following compounds were prepared: 4-piperidinophenylethylamine, B.P. 117–120° C./0.15 mm. Hg, and its dihydrochloride, M.P. 233–235° C., by reduction of 4-piperidinophenylacetamide; 2 - (4 - pyrrolidinophenyl)butylamine and its dihydrochloride by reduction of 2-(4-pyrrolidinophenyl)butyramide; 2 - (3 - piperidinophenyl)-propylamine, B.P. 122–124° C./0.3 mm. Hg, by reduction of 2 - (3 - piperidinophenyl)propionamide; N,N-dimethyl - 4 - piperidinophenylethylamine dihydrochloride, M.P. 250–253° C., by reduction of N,N-dimethyl-4-piperidinophenylacetamide; N,2,2 - trimethyl-2-(4-piperidinophenyl)ethylamine dihydrochloride by reduction of N,2,2 - trimethyl - 2-(4-piperidinophenyl)-acetamide; N-ethyl - 2-[4-(4-methyl-1-piperazinyl)phenyl]propylamine by reduction of N-ethyl-2-[4-(4-methyl-1-piperazinyl)phenyl]propionamide; 3-(3-trifluoromethyl-4-piperidinophenyl)butylamine by reduction of 3-(3-trifluoromethyl-4 - piperidinophenyl)butyramide; 3-chloro-4-homopiperidinophenylethylamine by reduction of 3-chloro-4-homopiperidinophenylacetamide; 3 - (4 - piperidinophenyl) propylamine dihydrochloride, M.P. 180° C. (dec.) by reduction of 3-(4-piperidinophenyl)propionamide; 2,2-dimethyl-2-(4-piperidinophenyl)ethyl amine succinic acid salt, M.P. 155–161° C., by reduction of 2,2-dimethyl-2-(4 - piperidinophenyl)acetamide; N'-methyl-N-(4-piperidinophenylethyl)piperazine by reduction of N'-methyl-N - (4 - piperidinophenylacetyl)piperazine; and N - (4-piperidinophenylethyl)piperidine, M.P. 42–44° C., reduction of N-(4-piperidinophenylacetyl)piperidine.

EXAMPLE 4

(a) β-Nitro-3-chloro-4-piperidinostyrene (5.15 g.)—preparable by the known method of reacting the corresponding benzaldehyde in glacial acetic acid containing ammonium acetate with nitromethane—in ether (70 ml.) was added dropwise to lithium aluminum hydride (2.6 g., 0.0688 mole) in ether (100 ml.) under nitrogen at such a rate that gentle reflux was maintained (25 minutes) and stirred at room temperature overnight. The mixture was cooled to 0° C. and treated with water (5 ml.) followed by 20% sodium acetate trihydrate solution (150 ml.). The ether phase was separated and the aqueous phase was 3 times extracted with ether. The ether was washed with sodium chloride solution, dried (Na₂SO₄) and evaporated to leave an oil which was distilled to give 3-chloro-4-piperidinophenylethylamine, B.P. 163–164° C./3 mm. Hg. This was converted to its dihydrochloride by means of hydrogen chloride in ether. The dihydrochloride formed flaky needles, M.P. 198–200° C. (dec.), from ethyl acetate-ethanol mixture.

(b) β-Methyl-β-nitro-4-piperidinostyrene (20.5 g.)—obtained by condensation of 4-piperidinobenzaldehyde and nitroethane—was reduced as described in Example (a) above to yield 1-methyl-2-(4-piperidinophenyl)ethylamine, B.P. 116–120° C./0.15 mm. Hg, which was then converted to its succinic acid salt, M.P. 172–173° C. By similar reductions of the corresponding nitrostyrenes, the following compounds were prepared: 3-piperidinophenylethylamine, B.P. 110–112° C./0.15 mm. Hg, from β-nitro - 3 - piperidinostyrene; 2 - (4 - piperidinophenyl) propylamine, B.P. 112–114° C./0.25 mm. Hg, from α-methyl - β - nitro - 4 - piperidinostyrene; 2-(4-pyrrolidinophenyl)butylamine from α-ethyl-β-nitro-4-pyrrolidinostyrene; 1 - methyl - 2 - (3-bromo-4-morpholinophenyl) propylamine from a,β-dimethyl-β-nitro-3-bromo-4-morpholinostyrene; 3 chloro-4-piperidinophenylethylamine, B.P. 163–164° C./3 mm. Hg, from β-nitro-3-chloro-4-piperidinostyrene; 1 - ethyl - 2 - )3-methyl-4-homopiperidinophenyl)propylamine from α-methyl-β-ethyl-β-nitro-3-methyl-4-homopiperidinostyrene; 4 - piperazinylphenylethylamine from β-nitro-4-piperazinylstyrene; and 2-piperidinophenylethylamine, B.P. 90–110° C./0.7 mm. Hg, from β-nitro-2-piperidinostyrene.

The primary amines produced by this process are converted to secondary and tertiary amines by the process of Example 2.

EXAMPLE 5

2-(4-fluorophenyl)propylamine (0.2 mole) and piperidine (0.24 mole) were stirred for 3 hours at 100° C. in dimethyl sulphoxide (80 ml.) containing anhydrous potassium carbonate (0.2 mole). The reaction mixture was cooled, poured into water, extracted with ether, dried over sodium sulphate, filtered, evaporated and distilled to give 2-(4-piperidinophenyl)propylamine, B.P. 112–114° C./0.25 mm. Hg.

By the use of similar condensation reactions, the following compounds were prepared: 4-piperidinophenylethylamine, B.P. 117–120° C./0.15 mm. Hg, by condensing 4-chlorophenylethylamine and piperidine; 2-(4-pyrrolidinophenylbutylamine), by condensing 2-(4-fluorophenyl)butylamine and pyrrolidine; 2 - (3-amino-4-piperidinophenyl) propylamine by condensing 2 - (3-amino-4-fluorophenyl)propylamine and piperidine; 2-[4-(4-methyl-1-piperazinyl)phenyl]-propylamine by condensing 2 - (4-fluorophenyl) propylamine with 4 - methylpiperazine; 2-(3-methoxy-4-homopiperidinophenyl)propylamine by condensing 2-(3-methoxy - 4-chlorophenyl)propylamine with homopiperidine; 1 - methyl-2-(3-methyl-4-morpholinophenyl)propylamine by condensing 1-methyl-2-(3-methyl-4-fluorophenyl)propylamine with morpholine; 2,2-dimethyl-2-(4-piperidinophenyl)-ethylamine succinic acid salt, M.P. 155–161° C., and N,N,2,2-tetramethyl-2-(4-piperidinophenyl)ethylamine by condensing respectively 2,2-dimethyl-2-(4-fluorophenyl)ethylamine and N,N,2,2 - tetramethyl-2-(4-chlorophenyl)-ethylamine with piperidine; N-acetyl-2-(4-piperidinophenyl)propylamine, M.P. 70–73° C., by condensing N-acetyl-2-(4-fluorophenyl)propylamine with piperidine; N - (4 - piperidinophenylacetyl)-4-piperidinophenylethylamine, M.P. 156–158° C., by condensing N-(4-piperidinophenylacetyl) - 4-fluorophenylethylamine with piperidine; and N - (4-piperidinophenylethyl)-piperidine, B.P. 163–166° C./0.6 mm. Hg, by condensing N-(4-chlorophenylethyl)piperidine with piperidine.

EXAMPLE 6

(a) N - methyl - 4-aminophenylethylamine (1 mole), potassium carbonate (1.1 mole), cuprous iodide (0.015 mole), potassium iodide (0.015 mole) and 1,5-dibromopentane (1.5 mole) were stirred at 130° C. for 15 hours in dimethylformamide (200 ml.). After working up the reaction mixture as described in Example 2(f), N-methyl-4-piperidinophenylethylamine was obtained and isolated as its succinic acid salt, M.P. 132–133° C.

(b) N-acetyl-2-(4-aminophenyl)propylamine was condensed with 1,5-dibromopentane in the manner described at (a) above to yield N-acetyl-2-(4-piperidinophenyl) propylamine. On hydrolysis with hydrochloric acid, 2-(4-piperidinophenyl)propylamine dihydrochloride, M.P. 226–229° C., was obtained.

Using similar procedures to those described above, the following compounds were prepared: 4-piperidinophenylethylamine, B.P. 117–120° C./0.15 mm. Hg, by condensing N-acetyl-4-aminophenylethylamine with 1,5-dichloropentane followed by hydrolysis: 2-(3-morpholinophenyl) propylamine by condensing N-acetyl-2-(3-aminophenyl) propylamine with di-β-chloroethylether followed by hydrolysis; N-methyl-2-[4-(4-methyl-1-piperazinyl)phenyl]-propylamine by condensing N-methyl-2-(4-aminophenyl) propylamine with N-methyl-di-O-bromoethylamine; N-(4-piperidinophenylethyl)piperidine, B.P. 163–166° C./0.6 mm. Hg, by condensing 4-aminophenylethylamine with 2 equivalents of 1,5-dibromopentane; 3-chloro-4-piperidinophenylethylamine, B.P. 163–164° C./3 mm. Hg, by condensing N-acetyl-3-chloro-4-aminophenylamine with 1,5-dichloropentane followed by hydrolysis; N-trifluoroacetyl-2 - (4-homopiperidinophenyl)propylamine by condensing N-trifluoroacetyl-2-(4-aminophenyl)propylamine with 1,6-dibromohexane; 1,2,2 - trimethyl-2-(4-piperidinophenyl) ethylamine by condensing N-acetyl-1,2,2-trimethyl-2-(4-aminophenyl)ethylamine with 1,5 - dibromopentane followed by hydrolysis; and N-methyl-N-trifluoroacetyl-4-piperidinophenylethylamine hydrochloride, M.P. 178–180° C., by condensing N - methyl - N-trifluoroacetyl-4-aminophenylethylamine with 1,5-dichloropentane.

EXAMPLE 7

The oxime (9.4 g.) of 2-(4-piperidinophenyl)propionaldehyde was dissolved in ethanol and heated with stirring whilst 500 g. of 2½% sodium amalgam was added. The reaction mixture was kept acid by continual addition of acetic acid. At the completion of the reaction, the yellow liquid was freed of alcohol by steam distillation and the residue warmed with water. The mixture was filtered to remove unchanged oxime and the filtrate yielded a brown oil on addition of potassium hydroxide solution. The mixture was extracted with ether and, after removal of the ether, the residue was distilled to give 7 g. of 2-(4-piperidinophenyl)propylamine, B.P. 112–114° C./0.25 mm. Hg.

Similarly by reduction of the oximes of other appropriate aldehydes the following compounds can be prepared:

4-piperidinophenylethylamine dihydrochloride, M.P. 233–235° C.
3-piperidinophenylethylamine, B.P. 110–112° C./0.15 mm. Hg
2-(4-pyrrolidinophenyl)butylamine
2-(3-bromo-4-morpholinophenyl)propylamine
2-(3-piperidinophenyl)propylamine, B.P. 122–124° C./0.3 mm. Hg
2-(3-chloro-4-piperidinophenyl)propylamine dihydrochloride
2-[4-(4-methyl-1-piperazinyl)phenyl]propylamine
3-chloro-4-piperidinophenylethylamine, B.P. 163–164° C./3 mm. Hg
3-methyl-4-piperidinophenylethylamine dihydrochloride
2-(3-methoxy-4-homopiperidinophenyl)propylamine
3-(3-trifluoromethyl-4-piperidinophenyl)butylamine
3-(4-piperidinophenyl)propylamine dihydrochloride, M.P. 180° C.
1-methyl-2-(4-piperidinophenyl)ethylamine, B.P. 116–120° C./0.15 mm. Hg
2-piperidinophenylethylamine, B.P. 90–110° C./0.7 mm. Hg
2,2-dimethyl-2-(4-piperidinophenyl)ethylamine succinic acid salt, M.P. 155–161° C.

The following secondary and tertiary amines can be prepared from the above primary amines by the method of Examples 2:

N,N-dimethyl-4-piperidinophenylethylamine, B.P. 121–123° C. /0.02 mm. Hg
N,N-dimethyl-2-(4-piperidinophenyl)propylamine dihydrochloride, M.P. 240–243° C.
N-trifluoroacetyl-4-piperidinophenylethylamine, M.P. 110–112° C.
N,N-diethyl-2-(4-piperidinophenyl)propylamine dihydrochloride
N-methyl-N-trifluoroacetyl-3-(4-piperidinophenyl)propylamine
N-acetyl-2-(3-chloro-4-piperidinophenyl)propylamine
N,N-dimethyl-2-(4-pyrrolidinophenyl)butylamine
N-methyl-2-(3-methoxy-4-homopiperidinophenyl)propylamine
N-acetyl-2-(4-piperidinophenyl)propylamine, M.P. 70–73° C.
N-trifluoroacetyl-2-(4-piperidinophenyl)propylamine, M.P. 84–87° C.
N-trifluoroacetyl-4-piperidinophenylethylamine, M.P. 110° C.
N-methyl-N-trifluoroacetyl-4-piperidinophenylethylamine hydrochloride, M.P. 178–180° C.
N-methyl-N-trifluoroacetyl-2-(4-piperidinophenyl)propylamine hydrochloride, M.P. 240–243° C.
N-methyl-2-(4-piperidinophenyl)propylamine
N-methyl-4-piperidinophenylethylamine, M.P. 132–133° C.
N-[2-(4-piperidinophenyl)propionyl]-2-(4-piperidinophenyl)propylamine
N-[2-(4-piperidinophenyl)propyl]piperidine
N-(4-piperidinophenylethyl)piperidine, B.P. 163–166° C./0.6 m. Hg
N-(4-piperidinophenylacetyl)-4-piperidinophenylethylamine, M.P. 156–158° C.

EXAMPLE 8

2-(4-piperidinophenyl)propionaldehyde (3 moles) was added to a solution of ammonia (51 g., 3 moles) in 300 ml. of cooled ethanol in an autoclave with 10 g. of Raney nickel catalyst. Under an initial pressure of 90 atmospheres, hydrogen absorption began at 40° C. and was complete in 30 minutes at a final temperature of 70° C. Distillation of the filtered reaction product gave 251 g. of 2 - (4-piperidinophenyl)propylamine, B.P. 112–114° C./0.25 mm. Hg.

Using similar reaction conditions, the appropriate aldehyde, and ammonia or the appropriate N-alkyl or N,N-dialkyl amine, the primary amines and the N-alkyl and N,N-dialkylamines exemplified in Example 7 can be prepared. The resultant primary amines can also be converted to secondary and tertiary amines by the method of Example 2.

EXAMPLE 9

(a) Ethyl 3-(4-piperidinophenyl)butyrate (0.1 mole), 85% hydrazine hydrate (7.5 ml., 0.1 mole) and absolute ethanol (10 ml.) were refluxed for 6 hours. The hydrazide which crystallised from the cooled mixture was collected and washed with a little ether. The hydrazide was dissolved in 150 ml. of ice-water containing 17 ml. of 6 N hydrochloric acid and to the solution was added with stirring a solution of sodium nitrite (7.5 g.) in 20 ml. of water, the temperature being kept below 10° C. At the end of the addition the mixture was stirred for a further 5 minutes, made alkaline by the addition of solid sodium bicarbonate and extracted with 4× 50 ml. of ether. The ether was dried for 3 minutes over CaCl$_2$, decanted into a flask containing 40 ml. of absolute ethanol and the ether distilled until the residual volume was 50 ml. This solution containing 3-(4-piperidinophenyl) butyric acid azide was boiled and the ethanol distilled off to leave N-[2-(1-piperidinophenyl)propyl]urethan, which was refluxed with 20 ml. concentrated hydrochloric acid and 10 ml. glacial acetic acid for 24 hours. The mixture was evaporated to dryness, treated with 2N sodium hydroxide solution, extracted with ether, the ether dried and evaporated off, and the residue distilled to give 6 g. of 2-(4-piperidinophenyl)propylamine, B.P. 112–114° C./0.25 mm. Hg. The same amine was obtained by heating the above acid azide with bromine in carbon tetrachloride or by heating the azide in benzene solution and hydrolysing the resultant isocyanate with boiling potassium hydroxide.

(b) 3-(4-piperidinophenyl)butyric acid (40 g.) was stirred, with cooling, with bromine (54 g., 18 ml.) and a solution of potassium hydroxide (20 g.) in water (200 ml.) was added. The resultant solution containing 2-(4-piperidinophenyl)propyl isocyanate was added to a stirred solution of potassium hydroxide (56 g.) in water (100 ml.) and the temperature maintained at 60–70° C. until the yellow colour disappeared. The cooled solution was extracted with ether and, after the usual processing steps, the residue was distilled to yield 20 g. of 2-(4-piperidinophenyl)propylamine, B.P. 112–114° C./0.25 mm. Hg.

Using similar reaction conditions to those described in (a) and (b) above and using the appropriate acid azide, urethan or isocyanate, the other primary amines exemplified in Example 7 can be prepared and converted to secondary and tertiary amines by the process of Example 2.

EXAMPLE 10

(a) 3-(4-piperidinophenyl)butyric acid (0.53 mole) in chloroform (500 ml.) was treated with concentrated sulphuric acid (20 ml.) and the mixture stirred vigorously at 40° C. Hydrazoic acid (52 ml. of a 5.3% solution in chloroform; 1.2 mole) was added slowly and, after evolution of nitrogen had ceased (2 hours), the mixture was poured into excess of sodium hydrogen carbonate solution. The chloroform layer was separated and the aqueous phase extracted with chloroform. The combined chloroform extracts were dried (Na$_2$SO$_4$), evaporated and the residue distilled to give 2-(4-piperidinophenyl)propylamine, B.P. 112–114° C./0.25 mm. Hg.

(b) 28% ammonia (1.72 moles) and 90% formic acid (1.72 moles) were cautiously mixed, the temperature of the solution raised to 160° C., and 0.344 mole of 4-piperidinophenylacetone added. The temperature was maintained at 160–170° C. for 7 hours. The resultant N-[1-methyl-2-(4-piperidinophenyl)ethyl]formamide was hydrolysed by refluxing the mixture for 8 hours with concentrated hydrochloric acid (120 ml.). The mixture was treated with charcoal, filtered, the filtrate made alkaline with ammonia and the product extracted with ether. After evaporation of the ether, the residue was distilled to give 1-methyl-2-(4-piperidinophenyl)ethylamine, B.P. 126–129° C./0.2 mm. Hg.

By treating the appropriate acid or formamide in the manner described in (a) and (b) above, the other primary amines exemplified in Example 7 can be prepared and can then be converted to secondary and tertiary amines by the process of Example 2.

EXAMPLE 11

(a) A solution of O-methylhydroxylamine (141 g., 3 moles) in anhydrous ether (300 ml.) was added gradually with vigorous stirring to a solution of 2-(4-piperidinophenyl)propyl magnesium bromide (prepared from 6 moles of 2-(4-piperidinophenyl)propyl bromide) in ether (3 litre), the temperature being maintained at −10° to −15° C. during the addition. After addition was complete, the temperature was kept at −10° C. for a further 30 minutes and then allowed to rise slowly to room temperature. Finally the reaction mixture was refluxed for 2 hours. It was then cooled and treated at 0° C. with 5 N-hydrochloric acid (3 litres), the layers being separated and the aqueous solution evaporated to small bulk under reduced pressure. The residue was strongly basified with 50% aqueous potassium hydroxide and extracted with ether. After the usual processing, distillation yielded 2-(4-piperidinophenyl)-propylamine, B.P. 112–114° C./0.25 mm. Hg.

(b) A mixture of 2-(4-piperidinophenyl)propyl bromide (0.4 mole) and anhydrous acetamide (94.4 g., 1.6 mole) was heated for 2 to 3 hours under reflux in an oil bath at 200° C. The mixture was cooled, treated with sodium hydroxide, extracted with ether, the extracts dried and the ether removed to yield N-acetyl-2-(4-piperidinophenyl)propylamine (0.32 mole), M.P. 70–73° C.

The amide was refluxed for 3 hours with concentrated hydrochloric acid (150 ml.), the solution evaporated to dryness and the base liberated with 40% potassium hydroxide. It was extracted with ether and, after the usual processing, distillation yielded 2 - (4-piperidinophenyl)propylamine, B.P. 112–114° C./0.25 mm. Hg. The latter amine was also obtained by reaction of the above propyl bromide with hexamethylenetetramine in hot ethanol in the presence of sodium iodide.

Using the methods described at (a) and (b) above, the other primary amines and N-acylated amines described in Example 7 can be prepared and can then be converted to secondary and tertiary amines by the process of Example 2.

EXAMPLE 12

A mixture of 2-amino-3-(4-piperidinophenyl)butyric acid (10 g.) and acetophenone (40 g.) was heated for 2 hours at 150° C. under nitrogen. The mixture was cooled, treated with 3 N-hydrochloric acid and the aqueous layer separated. The organic layer was washed with water and the aqueous layer and washings concentrated to yield (85%) 2-(4-piperidinophenyl)propylamine dihydrochloride, M.P. 226–229° C.

By using the above procedure applied to other suitable aminoacids, the primary amines described in Example 7 may be prepared and converted to secondary and tertiary amines as described in Example 2.

EXAMPLE 13

α-Methyl-4-piperidinostyrene (5.03 g.) in tetrahydrofuran (4 ml.) was flushed with nitrogen and 8.3 ml. of a 1 M solution of diborane in tetrahydrofuran was added. The mixture was stirred at room temperature for 1 hour and then treated with sodium hydroxylamine-O-sulphonic acid (2.08 g.). The mixture was refluxed for 3 hours, cooled and acidified with 2 N-hydrochloric acid. Treatment with sodium hydrogen carbonate (8 g.) gave an oil which was extracted with ether. After the usual processing, the oil was distilled to yield 2-(4-piperidinophenyl)propylamine, B.P. 112–114° C./0.25 mm. Hg.

Using appropriately substituted styrenes, the following amines were prepared by the above procedure:

4-piperidinophenylethylamine dihydrochloride, M.P. 233–235° C.
3-piperidinophenylethylamine, B.P. 110–112° C./0.15 mm. Hg
2-(4-pyrrolidinophenyl)butylamine
2-(3-bromo-4-morpholinophenyl)propylamine
2-(3-piperidinophenyl)propylamine, B.P. 122–124° C./0.3 mm. Hg
2-(3-chloro-4-piperidinophenyl)propylamine dihydrochloride
2-[4-(4-methyl-1-piperazinyl)phenyl]propylamine
3-chloro-4-piperidinophenylethylamine, B.P. 163–164° C./3 mm. Hg
3-methyl-4-piperidinophenylethylamine dihydrochloride
2-(3-methoxy-4-homopiperidinophenyl)propylamine
1-methyl-2-(4-piperidinophenyl)ethylamine, B.P. 116–120° C./0.15 mm. Hg
2-piperidinophenylethylamine, B.P. 90–110° C./0.7 mm. Hg The following secondary and tertiary amines can be prepared from the above primary amines by the method of Example 2:

N,N-dimethyl-4-piperidinophenylethylamine, B.P. 121–123° C./0.02 mm. Hg
N,N-dimethyl-2-(4-piperidinophenyl)propylamine dihydrochloride, M.P. 240–243° C.
N-trifluoroacetyl-4-piperidinophenylethylamine, M.P. 110–112° C.
N,N-diethyl-2-(4-piperidinophenyl)propylamine dihydrochloride
N-acetyl-2-(3-chloro-4-piperidinophenyl)propylamine
N,N-dimethyl-2-(4-pyrrolidinophenyl)butylamine
N-methyl-2-(3-methoy-4-homopiperidinophenyl)propylamine
N-acetyl-2-(4-piperidinophenyl)propylamine, M.P. 70–73° C.
N-trifluoroacetyl-2-(4-piperidinophenyl)propylamine, M.P. 84–87° C.
N-trifluoroacetyl-4-piperidinophenylethylamine, M.P. 110° C.
N-methyl-N-trifluoroacetyl-4-piperidinophenylethylamine hydrochloride, M.P. 178–180° C.
N-methyl-N-trifluoroacetyl-2-(4-piperidinophenyl)propylamine hydrochlorid, M.P. 240–243° C.
N-methyl-2-(4-piperidinophenyl)propylamine
N-methyl-4-piperidinophenylethylamine, M.P. 132–133° C.
N-[2-(4-piperidinophenyl)propionyl]-2-(4-piperidinophenyl)propylamine
N-[2-(4-piperidinophenyl)propyl]piperidine
N-(2-piperidinophenylethyl)piperidine, B.P. 163–166° C./0.6 mm. Hg
N-(4-piperidinophenylacetyl)-4-piperidinophenylethylamine, M.P. 156–158° C.

EXAMPLE 14

To dry N-phenylpiperidine (14 ml.) and powdered aluminium chloride (10.2 g.) was added with stirring at below 15° C. a 0.04 M. solution of 1,2-propyleneimine. After stirring at room temperature for 30 minutes, the mixture was chilled, then sealed in an ampoule and kept for 7 to 8 hours at 170–180° C. It was then poured into an ice-cold solution of potassium hydroxide in water, the liberated oil extracted with ether, and after the usual processing, the product was fractionally distilled to give 1-methyl - 2 - (4-piperidinophenyl)ethylamine, B.P. 126–129° C./0.2 mm. Hg and 2-(4-piperidinophenyl)propylamine, B.P. 112–114° C./0.25 mm. Hg in the ratio of 1:4.

Using similar procedures, the following amines can be prepared:

2-(4-pyrrolidinophenyl)butylamine
2-(3-bromo-4-morpholinophenyl)propylamine
2-(3-chloro-4-piperidinophenyl)propylamine dihydrochloride
2-[4-(4-methyl-1-piperazinyl)phenyl]propylamine
2-(3-methoxy-4-homopiperidinophenyl)propylamine The following secondary and tertiary amines can be prepared from the above primary amines by the method of Example 2:

N,N-dimethyl-2-(4-piperidinophenyl)propylamine dihydrochloride, M.P. 240–243° C.
N,N-diethyl-2-(4-piperidinophenyl)propylamine dihydrochloride
N-acetyl-2-(3-chloro-4-piperidinophenyl)propylamine
N,N-dimethyl-2-(4-pyrrolidinophenyl)butylamine
N-methyl-2-(3-methoxy-4-homopiperidinophenyl)propylamine
N-acetyl-2-(4-piperidinophenyl)propylamine, M.P. 70–73° C.
N-trifluoroacetyl-2-(4-piperidinophenyl)propylamine, M.P. 84–87° C.
N-methyl-N-trifluoroacetyl-2-(4-piperidinophenyl)propylamine hydrochloride, M.P. 240–243° C.
N-methyl-2-(4-piperidinophenyl)propylamine
N-[2-(4-piperidinophenyl)propionyl]-2-(4-piperidinophenyl)propylamine
N-[2-(4-piperidinophenyl)propyl]piperidine

We claim:
1. A compound selected from the group consisting of N - trifluoroacetyl - 2 - (4-piperidinophenyl)ethylamine, N-trifluoroacetyl-2-(4-piperidinophenyl)propylamine, and a pharmaceutically acceptable acid addition salt of one of those compounds.
2. A compound selected from the group consisting of N-methyl - N - trifluoroacetyl-2-(piperidinophenyl)ethylamine, N - methyl-N-trifluoroacetyl-2-(piperidinophenyl)propylamine and a pharmaceutically acceptable acid addition salt of one of those compounds.

References Cited

FOREIGN PATENTS 705,506   3/1954   Great Britain _____ 260—570.8

OTHER REFERENCES

Ashley et al.: J. Chem. Soc., 1957, 2706–13.
Benington et al.: J. Org. Chem. 21, 1470–2 (1956).

HENRY R. JILES, Primary Examiner

G. T. TODD, Assistant Examiner

U.S. Cl. X.R.

260—239 R, 239 BF, 247.1, 247.2 A, 247.5 R, 268 PH, 293.64, 293.69, 293.71, 293.76, 293.78, 326.3, 326.55, 326.5 G, 326.51, 326.85, 562 R, 562 A 570.8 R, 999

UNITED STATES PATENT OFFICE
CERTIFICATE OF CORRECTION

PATENT NO. : 3,729,475
DATED : April 24, 1973
INVENTOR(S) : William Robert Nigel Williamson et al.

It is certified that error appears in the above-identified patent and that said Letters Patent are hereby corrected as shown below:

Column 1, line 24, add the title --SPECIFICATION--.

Column 2, line 9, in the formula, a single bond should be drawn between the "R³" and the "CH".

Column 3, line 48, in the formula, "A " should read --R --

Column 3, line 66, add the word --is-- at the beginning of the line before the word "well".

Column 6, line 59, delete the word "solution" and insert therefor --addition--.

Column 7, line 53, delete "60" and insert therefor --50--.

Column 11, line 33, delete "obtained" and insert therefore --obtainable--.

Column 12, line 45, within the compound, after "di" and before "bromoethylamine", delete "O" and insert therefor --β--.

Column 14, line 21, before "minutes", delete "3" and insert therefor --5--.

Column 14, line 58, delete "(20 ml.)" and insert therefor --(30 ml.)--.

Column 16, line 56, after "N-(_, delete "2" and insert therefor --4--.

In the claims, column 18, line 7, after "-2-(" and before "piperidinophenyl)ethyl-", insert -- 4- --.

In the claims, column 18, line 8, after "-2-(" and before "piperidinophenyl)ethyl-", insert -- 4- --.

Signed and Sealed this ninth Day of September 1975

[SEAL]

Attest:

RUTH C. MASON
Attesting Officer

C. MARSHALL DANN
Commissioner of Patents and Trademarks